Nov. 12, 1957  H. C. WARREN  2,813,263
AUTOMATIC CONTROL CIRCUITS
Filed Sept. 15, 1953
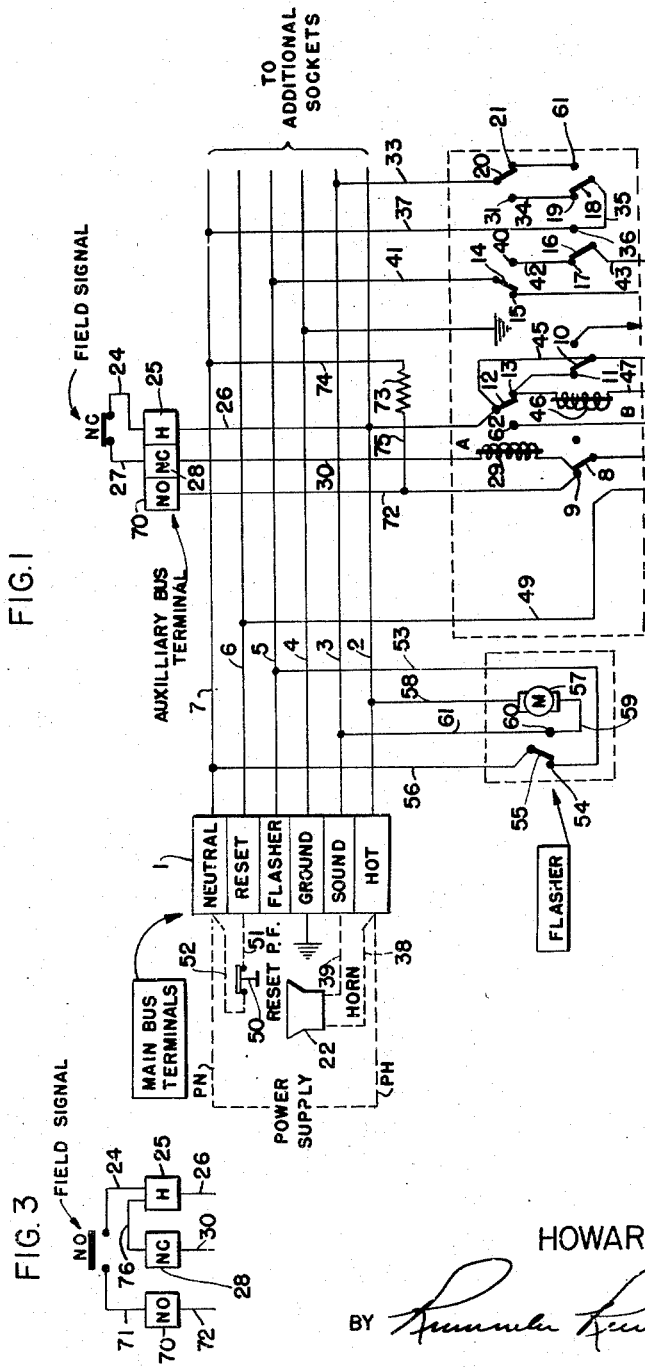
INVENTOR:
HOWARD C. WARREN
BY
ATT'YS

United States Patent Office 2,813,263
Patented Nov. 12, 1957

2,813,263
AUTOMATIC CONTROL CIRCUITS
Howard C. Warren, Chicago, Ill.

Application September 15, 1953, Serial No. 380,216

10 Claims. (Cl. 340—213)

This invention relates to improvements in automatic control circuits which are particularly adapted, but limited, to manufacturing industries.

In modern industry today, because of the increasing labor costs, more complex manufacturing processes and lack of skilled operators, the trend is to more closely police the process and machinery to obtain the optimum efficiency and automatic control. This, of course, can be done by supervision on the floor but almost always, when the element is involved, the chances of error are always present.

Therefore, attempts have been made to automatically accomplish the foregoing by using an electrically controlled alarm or annunciator system which, although it is useful, is usually custom-made to a particular industrial plant, making it extremely expensive to build. Also false monitoring is present when for instance, something in the electric circuit becomes faulty, or fails.

It is the primary object of this invention to overcome these inherent defects in the present day automatic control systems of this character.

Other objects of this invention are to provide a new and improved electrical circuit for automatically and continuously policing manufacturing processes and including machinery in industrial plants; to provide an alarm system of this character wherein normally open or normally closed field-switch devices may be used interchangeably with an annunciator; to provide an alarm system of this character wherein an automatic, continuous means of sounding a warning if any contact-making device in the system should become defective; to provide a single electrical assembly that may be used interchangeably with a normally open or a normally closed field signal to provide a system of this character which signals its own failure as well as system defects; to provide a policing circuit of this character which is an automatically and continuously self-supervised circuit for industrial alarms.

An illustrative embodiment of this invention is shown in the accompanying drawings in which:

Figure 1 is a diagrammatic view of a normally closed field signal circuit of my invention.

Fig. 2 discloses the alarm sequence.

Fig. 3 is a diagrammatic view showing the wiring diagram of the normally open field signal with the auxiliary bus terminals.

Referring in detail to the drawing, the main bus terminal 1 is arranged so as to be common to all alarm points in the annunciator. The individual terminals are identified in the drawing by the wording neutral, reset, flasher, ground, sound and hot.

The positive side of the power supply is connected to the "hot" terminal by the lead "P. H." and the negative side is connected to the "neutral" terminal by the lead "P. N."

The main bus terminal 1 has six leads extending therefrom identified by the numerals 2, 3, 4, 5, 6 and 7, connected to the "hot," "sound," "ground," "flasher," "reset" and "neutral" terminals respectively.

As shown in the drawings, the field signal device is in normally closed position, that is, the device and/or object to which it is applied, is operating satisfactorily. Field signal devices may be a pressure, vacuum, or a thermostatic switch, an air or fluid flow switch, a capacitance, a thermocouple, or any such similar device.

The two relays A and B are energized with their respective switches in the positions shown in the drawing, i. e. switch arm 8 is in contact with contact 9; switch arm 10 in contact with contact 11; switch arm 12 in contact with contact 13; switch arm 14 in contact with switch arm 15; switch arm 16 in contact with contact 17; switch arm 18 in contact with contact 19; and switch arm 20 in contact with contact 21. With the circuit in this condition, the horn 22 will be silent and the lamps 23 will not be energized.

The field signal device in this closed position is connected on one side by lead 24 to the auxiliary bus terminal 25 designated "H" which in turn is connected by leads 26 and 2 to the "hot" terminal of the main bus terminal 1, and switch arm 12 of the "A" relay. The other side of the field signal device is connected by lead 27 to the "NC" terminal 28 of the auxiliary bus terminal and to the "A" relay coil 29 by lead 30.

When the field signal device of this circuit is opened, due to an unfavorable condition, such as, for instance, stoppage of flow of fluid or a reduced flow which may be dangerously low, through an oil pipe, if the system of the present invention were installed for the purpose of maintaining this type of control, the "A" relay coil 29 will become de-energized causing the switch arm 20 to shift from contact 21 to contact 31, thus completing the horn circuit and causing an audible signal, this circuit being completed through lead 3, lead 33, switch arm 20, contact 31, lead 34, contact 19, switch 18, lead 35, contact 36, leads 37 and 7, to the neutral bus terminal, the horn 22 being in circuit being the "hot" and "sound" bus terminals through leads 38 and 39.

At the same time when the "A" relay coil 29 is de-energized, switch arm 14 shifts from contact 15 to contact 40 to complete the lamp circuit and energize the lamps 23. The circuit is then completed through the "flasher" terminal main lead 5 through lead 41, switch arm 14, contact 40, lead 42, contact 17, switch arm 16, lead 43 to one side of lamps 23, thence from the opposite side through lead 44, jumper wire 45, to the "hot" main terminal lead 2. The contact arm 12 having shifted to contact 62 upon de-energizing of the "A" relay coil 29.

When the horn circuit is completed, as hereinbefore described when the field signal has been opened, the flasher motor 57 will be energized through being connected to the main "hot" lead 2 through lead 58 on one side and on the other side through lead 59, contact 60, lead 61 to the "sound" lead 3 and bus terminal respectively. As the flasher motor is of the usual double throw snap action type, having a cam in connection therewith to cause the switch 55 to shift by the action of the cam intermittently between contacts 54 and 60, the lamps 23 will flash on and off. This is accomplished because lead 41 is connected to the "flasher" lead 5, to which lead 53 is connected. The other end of lead 53 is connected to contact 54, switch arm 55, lead 56 and "neutral" lead 7, to the neutral bus terminal.

It will thus be seen that when the field device is opened the lamps will flash on and off in the light box and the horn will emit an audible sound thereby attracting attention both visually and audibly in the same or different locations respectively of the abnormal condition.

To silence the horn, the reset push button 50 is depressed thereby breaking the circuit between the "neutral" and "reset" bus terminals and creating a break between leads 51 and 52. During all the aforesaid time while the horn and lamp were energized the "B" relay coil 46 was energized. By operation of the reset mechanism 50 it will be apparent that the "B" relay coil 46 becomes de-energized thus causing contact arm 18 to shift from contact 19 to contact 61 and open the aforesaid "horn" circuit. Simultaneously, since the flasher motor is in the "sound" circuit it will likewise become de-energized and stop. However, if the switch arm 55 is in contact with contact 60, at that moment the motor will continue movement until switch arm 55 returns to its normal position in contact with contact 54. At the same time contact arm 16 will shift from contact 17 to contact 36 and provide a circuit for energizing lamps 23 so they will now give off a steady signal.

Thus the lamps will give off a steady signal indicating an abnormal field signal condition, even when the horn is turned off, until the field signal returns to its normally closed state.

When the field signal is returned to its normally closed position the "A" relay coil 29 will again become energized, at which moment switch arm 12 will shift from contact 62 to contact 13 thereby energizing the "B" relay coil 46, and all switch arms, will return to the normal state as shown in Fig. 1, and thus the circuit is ready for subsequent field signal alarms.

The main bus terminal leads 2 to 7 inclusive may be used ad infinitum, for additional field signals, but in each case an additional set of (1) auxiliary bus terminals, lamp box and "A" and "B" relay circuits, are required for each field signal device.

*Operation of normally open field signal*

To utilize the same system as described above, but using a normally open field signal instead of a normally closed field signal as heretofore described, the field signal requires additional wiring. In this case the field signal is connected on one side to the "H" terminal 25 of the auxiliary bus terminal, the same as heretofore described, and on the other side to terminal 70, marked "NO" on the auxiliary bus terminal by lead 71. Lead 72 connects the terminal 70 with contact 9 of switch 8, and a resistor 73 is placed in the circuit between the neutral side 7 of the line and the neutral side of "A" relay coil 29 by leads 74—75 respectively. Also a jumper wire 76 is placed between the terminals 25—28 (terminals "H" and "NC" of the auxiliary bus terminal) to maintain the "A" relay in normally energized condition. All the balance of the circuit used in connection with a normally closed field signal device remains the same. When the normally open field signal device is actuated, the field contact closes due to an abnormal field situation, and both sides of the "A" relay coil 29 then have the same polarity, thus de-energizing the "A" relay coil 29 so that the alarm sequence is duplicated as described above for a normally closed field switch device. When the "A" relay coil 29 is de-energized, contact 21 opens and switch arm 20 will shift to contact 31, thereby initiating the audible and visual alarm sequence heretofore described.

When the normally open field signal contact is closed so as to provide the same potential on both sides of the "A" relay, the "A" relay will drop out. However, to prevent a dead short between the neutral side of the "A" relay coil 29, and the "hot" side of the line, I have provided a resistor 73 which is connected between the neutral side of the line and the neutral side of the "A" relay coil 29.

When the normally open field signal returns to normal the "A" relay coil 29 thus is provided with a potential impressed across it and the "A" relay coil 29 is again energized. As the "A" relay coil 29 is energized the switch arm 12 returns to its contact 13, thus energizing the "B" relay coil 46. This returns the circuit to its normal condition where both relays "A" and "B" are energized and ready for subsequent field signals.

The resistor 73 is needed in a normally open field signal circuit so that two important characteristics can be provided in one standard electrical assembly. The two characteristics are, (*a*) an automatic "fail safe" feature which is dependent upon the "A" relay (connected to the resistor 73), being energized at all times, and (*b*) a single electrical assembly that may be used interchangeably with normally open or normally closed field signals.

In connection with both the normally open and normally closed field signal circuits, it will be seen that if the "A" relay coil becomes de-energized due to some defect in the relay circuit, contact 31 will be closed by the shifting of the switch arm 20, thus sounding the audible alarm and simultaneously switch arm 14 will shift to contact 40 thereby energizing the signal lamps, so as to indicate a failure. Conversely, if the "B" relay becomes de-energized due to some defect in the circuit, the contact 61 will be closed by the shifting of switch arm 16, thereby sounding the audible alarm signal and contact 36 will be closed due to the shifting of switch arm 16, thus illuminating the signal lamp.

It should, therefore, be apparent that I have provided an automatic continuous self-supervision of the alarm system itself, since both the "A" and "B" relays are always normally energized and therefore, if either the "A" or "B" relays become de-energized due to faulty wiring of the alarm circuit or internal failure of the relay itself, a means is provided for indicating this condition.

Thus, I have provided substantially two circuits in my system, namely, an alarm circuit and a signal circuit. The signal circuit can be said to include the field signal, the two energized relays "A" and "B," the resistor 73 and associated wiring and switches in the "normal" position as shown in the drawing; while the alarm circuit becomes effective upon the actuation of the field signal and includes the circuit after the "A" relay has been de-energized to effect energizing of the autidble signal and a flashing visual signal, and subsequent de-energizing of the "B" relay after the "reset" switch has been opened, to silence the audible signal and permit a steady visual signal.

Although but one specific embodiment of this invention is herein shown and described, it will be understood that numerous details of the construction shown may be altered or omitted without departing from the spirit of the invention as defined by the following claims:

I claim:

1. In a self-monitoring annunciator system adapted for use with a field signal switch having selectively a normally open or normally closed condition for indicating a change from the normal condition thereof and being operative also to indicate an operational failure within itself, signal means adapted to be electrically actuated, a first and a second relay connected together so that the energization of the second relay is dependent upon and follows a prior energization of the first but when once energized, maintains its energized condition independently of the first, and circuit means operatively connecting said signal means and said relays and being adapted to have said field signal switch interposed therein, said circuit means being arranged for energizing said first relay when said field signal switch is in its normal condition and for de-energizing the first relay upon a change in the field signal switch from its normal condition, said circuit means also being arranged for actuating said signal means when said first relay is de-energized by a change in condition of said field signal switch and also when either of said relays is de-energized by an internal failure in said system.

2. The system of claim 1 in which said signal means comprises an audible signal device and a visual device, and in which a manual switch is provided in circuit with said second relay for de-energizing the same, said audible signal device being arranged in said circuit means with said second relay so that it is deactuated when said manual switch is depressed to de-energize said second relay after said first relay is de-energized by a change in condition of said field signal switch, said visual signal device being maintained in an actuated state until said field signal switch is returned to its normal condition.

3. In a self-monitoring annunciator system adapted for use with a field signal switch having selectively a normally open or normally closed condition, said system being operative to signal a change in the switch from the normal condition thereof and being operative also to signal a failure of the system itself, signal means, a first and second relay connected together so that the energization of the second relay is dependent upon and follows a prior energization of the first relay but when once energized, maintains its energized condition independently of the first relay, circuit means operatively connecting said signal means and said relays, and additional circuit means adapted to be connected to a source of power and to have said field signal switch interposed therein, said additional circuit means being operatively arranged for providing a flow of energizing current through said first relay when said field signal switch is in its normal condition and for terminating the flow of energizing current through the first relay when said field signal switch is changed from its normal condition, said circuit means being operatively arranged for actuating said signal means when said first relay is de-energized by a change in condition of said field signal switch and also for actuating said signal means when either of said relays is de-energized by an internal failure in said system.

4. In an annunciator system having separate annunciator means for indicating the abnormal and normal conditions of a number of variables, respective signal contact responsive relay apparatus and associated circuitry connected with said annunciator means for operating the same, signal switch connecting terminal means associated with each annunciator means and adapted for selective connection to either normally open or normally closed signal contacts, the operation of which is controlled by the normal and abnormal condition of the associated variable, means operatively connecting each signal switch connecting terminal means to the associated relay apparatus, said associated circuitry including circuit connections which effect operation of the same associated relay apparatus to provide identical operation of associated annunciator means when the associated signal switch connecting terminal means are connected to either normally open or normally closed signal contacts.

5. In an annunciator system having respective annunciator means for indicating the abnormal and normal conditions of a number of variables, audible alerting means for attracting attention to said annunciator means, and manually operated acknowledge switch means for silencing the alerting means: respectively signal contact responsive relay apparatus and associated circuitry connected with said annunciator means, audible alerting means and acknowledge switch means, signal switch connecting terminal means associated with each annunciator means and adapted for selective connection to either normally open or normally closed signal contacts, the operation of which is controlled by the normal and abnormal condition of the associated variable, means operatively connecting each signal switch connecting terminal means to associated relay apparatus, said associated circuitry including circuit connections which effect operation of the same associated relay apparatus to provide identical operation of the associated annunciator means and alerting means when said signal switch connecting terminal means are connected to either normally open or normally closed signal contacts.

6. In combination, an audible annunciator, a number of visual annunciators for indicating the condition of a number of variables, acknowledge switch control means for silencing said audible annunciator and changing the visual signal of said visual annunciators, respectively connecting terminal means associated with said variables for selective connection with condition-responsive signal contacts of either the normally open or normally closed type, relay apparatus and associated circuitry associated with each variable and connected to energize said audible annunciator and the associated visual annunciator when the associated signal switch is moved into its abnormal indicating position and to change the visual announcement of said visual annunciator and to silence said audible annunciator upon actuation of said acknowledge switch control means, said associated circuitry including means for providing identical operation of said audible and visual annunciators and said acknowledge switch control means when said connecting terminal means are connected with either normally open or normally closed signal contacts.

7. In an annunciator system, terminals for connection with individual signal annunciators which indicate the normal and abnormal conditions of a number of associated variables, respective relay unit connectors, respective removable control relay units each containing all relay apparatus exclusive to one of said signal annunciators and being insertable into contact with any one of said connectors to make electrical connection with said terminals, signal switch connecting terminals associated with each signal annunciator and adapted for selective connection with either normally open or normally closed signal contacts, and means associated with each relay unit for providing identical operation of the associated signal annunciator during successive opening and closing of the associated signal contacts whether of the normally open or normally closed type.

8. In an annunciator system operative to announce a change from normal in a monitored device having a field signal switch, selected to be either normally open or closed, the condition of which changes from normal with a change in condition from normal in the monitored device, a plurality of relay means, signal means for announcing abnormal conditions when energized, circuit means including said relay means and signal means and interconnecting the same for energizing the signal means whenever one or more of the said relay means is deenergized, and means interconnecting said field signal switch in said circuit means so that all of said relay means are energized when the field signal switch is in its normal condition, said signal means being actuated due to a change in condition of said field signal switch or to an operational failure within the system itself.

9. The annunciator system of claim 8 in which said relay means comprise a pair of relays, one of which is energized when said field signal switch is in its normal condition and the other of which is energized following the energization of the aforesaid relay but when once energized, maintains that condition independently of the aforesaid one relay.

10. In a self-monitoring annunciator system adapted for use with a field signal switch having selectively a normally open or normally closed condtion, said system being operative to announce a change in the switch from the normal condition thereof, signal means, first and second relay means connected together so that the energization of the second is dependent upon and follows a prior energization of the first but when once energized, maintains that condition independently of the first relay means, circuit means operatively connecting said signal means and said relay means, and additional circuit means adapted to be connected to a source of power and to have said field signal switch interposed in circuit therewith, said additional means being operatively arranged to provide a flow of energizing current through said first relay means when said field signal switch is in its normal condition and for terminating the flow of energizing current therethrough when the field signal switch is changed from its normal condition, said first mentioned circuit means being operatively arranged for actuating said signal means when said first relay means is deenergized by a change in condition of said field signal switch.

References Cited in the file of this patent

UNITED STATES PATENTS

| | | |
|---|---|---|
| 1,229,939 | Goldstein | June 12, 1917 |
| 1,537,211 | Wootton | May 12, 1925 |
| 1,640,325 | Janson | Aug. 23, 1927 |
| 1,686,492 | Janson | Oct. 2, 1928 |
| 1,920,153 | Clokey | July 25, 1933 |
| 2,119,326 | Grant | May 31, 1938 |
| 2,450,450 | Schmidinger | Oct. 5, 1948 |
| 2,469,001 | Poitras | May 3, 1949 |
| 2,600,132 | Seaton | June 10, 1952 |